Dec. 19, 1950 K. POSTHUMUS 2,534,624
TRANSMITTING DEVICE
Filed April 11, 1946
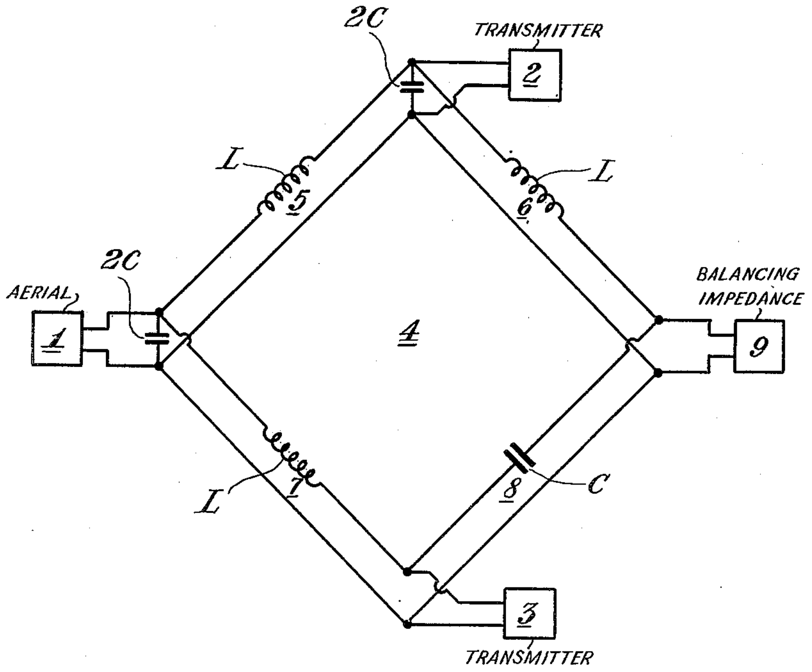
KLAAS POSTHUMUS
INVENTOR.
BY [signature]
ATTORNEY.

Patented Dec. 19, 1950

2,534,624

UNITED STATES PATENT OFFICE 2,534,624

TRANSMITTING DEVICE

Klaas Posthumus, Eindhoven, Netherlands, assignor, by mesne assignments, to Hartford National Bank and Trust Company, Hartford, Conn., as trustee Application April 11, 1946, Serial No. 661,200
In the Netherlands May 29, 1943

Section 1, Public Law 690, August 8, 1946
Patent expires May 29, 1963

5 Claims. (Cl. 250—17)

In practice it may occur that two transmitters whose carrier waves and modulation correspond to each other give off their energy to a common aerial.

The present invention purports to provide in this case an advantageous manner of connecting the transmitters and the aerial, which connection is in general applicable when the energy derived from two sources in the form of oscillations corresponding in carrier wave and in modulation must be supplied to a common load.

The invention starts from the recognition that in known devices of the kind described in the case of breakdown of one of the transmitters the other transmitter remains operative under conditions which may be considerably improved in a simple manner.

According to the invention, to this end use is made of a bridge connection including an impedance inverting four terminal network in each of the bridge arms, the phase-shifting which occurs between the output current and the input voltage of one of the four terminal network being opposite to the corresponding phase-shifting of the other four terminal network. The two energy sources are in this case connected to two opposite corner points of the bridge connection whereas the two other corner points have connected to them the common load and an impedance balancing the latter. With normal operation of the two transmitters no energy is lost in the balancing impedance. If, now, one of the transmitters becomes inoperative the other transmitter is by no means affected thereby.

It is observed that bridge connections of the described type, constituted by inverting networks, are known per se.

The impedance-inverting four terminal network are preferably realized as symmetric $\pi$-cells tuned to the operative wavelength, in which case the bridge connection constitutes an ohmic load for the transmitters while the bridge connection itself may be realized with a small number of elements.

The invention will be explained more fully by reference to the accompanying drawing showing, by way of example, one advantageous form of construction of a transmitting device according thereto.

In the figure, 1 indicates an aerial supplied from two transmitters 2 and 3. The aerial and the transmitters are relatively connected by means of a bridge connection 4 whose arms are constituted by impedance-inverting four terminal network 5, 6, 7, 8 which are realized as symmetric $\pi$-cells tuned to the operative wavelength. The transverse and the longitudinal reactances of these four terminal network are constituted by reactances of opposite signs and have the values indicated in the figure. The longitudinal reactances of the four terminal network 5, 6, 7 are inductive whereas the longitudinal reactance of the four terminal network 8 is capacitative so that with the first-mentioned four terminal network the phase-shifting between the output current ($I_u$) and the input voltage ($V_i$) is opposite to the corresponding phase-shifting with the last-mentioned four terminal network.

If with each of the four terminal network:

$$\omega L = \frac{1}{\omega C} = R_0$$

there applies for the four terminal network 5, 6, 7 the relation:

$$V_i = jR_0 I_u \qquad (1)$$

but for the four terminal network 8:

$$V_i = -jR_0 I_u \qquad (2)$$

If the four terminal network satisfy (1) and (2) and, in addition, in the corner point opposite the aerial 1 there is connected an impedance 9 balancing this aerial an undesirable action of the transmitters 2 and 3 upon each other is precluded in spite of their common load. Since the four terminal network 6 and 8 located between the transmitters 2 and 3 on the one hand and the balancing impedance 9 on the other hand bring about opposite shiftings of 90° there is not set up at the input terminals of the balancing impedance any voltage originating from the transmitters in the case of equal amplitude and phase of the output voltages of the transmitters, so that the balancing impedance cannot bring about any losses.

It is observed that the balancing impedance is necessary to prevent the transmitters from acting upon each other. In this connection it suffices to point out that a voltage impulse originating from the transmitter 2 could reach the transmitter 3, on the one hand, via the four terminal network 5, 7 and, on the other hand, via the four terminal network 6, 8, if the voltage impulses travelling by the two routes did not arrive in antiphase and, owing to the symmetrical construction of the bridge connection, with equal amplitude in the bridge corner-point connected to the transmitter 3, thus neutralizing each other in this point.

What I claim is:

1. A diplex transmission system comprising a pair of indentical signal-modulated high-frequency sources, a common load for said sources, a four arm bridge circuit each arm of which is constituted by a four terminal phase-shifting network, one of said networks providing a 90 degree phase displacement in one direction, the other networks each providing a 90 degree phase displacement in the reverse direction, and a load balancing impedance, the modulated oscillations of said two sources being separately applied to said bridge circuit at one pair of opposing vertices thereof, the load and said impedance being connected to said bridge circuit at the other pair of opposing vertices thereof.

2. A diplex transmission system comprising two like sources of high-frequency energy, means to modulate said two sources with corresponding signals, a four arm bridge circuit each arm of which is formed by a phase-shifting four terminal networks, one of said networks providing a 90 degree phase shift in one direction, the remaining networks each providing a 90 degree phase shift in the reverse direction, means separately connecting said two sources to one pair of opposing vertices of said bridge circuit, a load, and a load balancing impedance, said load and said impedance being connected to the other pair of opposing vertices of said bridge circuit.

3. A diplex transmission system comprising two like carrier sources, means to modulate said sources with corresponding signals, a common antenna, a four arm bridge circuit each arm of which is defined by a phase-shifting network, one of said networks providing a 90 degree phase displacement in one direction, the remaining networks each providing a 90 degree phase displacement in the reverse direction, and a balancing impedance for said antenna, said two modulated sources being separately connected to one pair of opposing vertices of said bridge circuit, said antenna and said impedance being connected to the other pair of opposing vertices of said bridge circuit.

4. A transmission system for supplying oscillations from a pair of identical modulated carrier wave sources to a common antenna, said system comprising a four arm bridge circuit each arm of which is defined by a four terminal phase-shifting network, each network being constituted by a symmetrical pi section of capacitative and inductive elements tuned to the carrier wavelength of said sources, one of said networks providing a 90 degree phase displacement in one direction, the remaining networks providing a 90 degree phase displacement in the reverse direction, and a balancing impedance for said antenna, said pair of sources being connected to one pair of opposing vertices of said bridge circuit, said antenna and said impedance being connected to the other pair of opposing vertices of said bridge circuit.

5. A transmission system comprising a pair of identical modulated carrier wave sources, a four arm bridge circuit each arm of which is defined by a four terminal phase-shifting network, each network being constituted by a symmetrical pi section of inductive and capacitative elements tuned to the carrier wavelength of said sources, one of said networks introducing a 90 degree phase displacement in one direction, the remaining three networks introducing a 90 degree phase displacement in the reverse direction, an antenna, a balancing impedance for said antenna, means connecting said pair of sources to one pair of opposing vertices of said bridge circuit, and means connecting said antenna and said impedance to the other pair of opposing vertices of said bridge circuit, whereby said two sources act to energize said antenna without interaction therebetween.

KLAAS POSTHUMUS.

REFERENCES CITED

The following references are of record in the file of this patent:

UNITED STATES PATENTS

| Number | Name | Date |
|---|---|---|
| 1,969,328 | Roosenstein | Aug. 7, 1934 |
| 2,147,809 | Alford | Feb. 21, 1939 |
| 2,258,148 | Schüssler | Oct. 7, 1941 |
| 2,283,897 | Alford | May 26, 1942 |
| 2,416,790 | Barrow | Mar. 4, 1947 |
| 2,424,156 | Espley | July 15, 1947 |
| 2,445,895 | Tyrrell | July 27, 1948 |